United States Patent [19]

Shimizu et al.

[11] Patent Number: 5,707,763

[45] Date of Patent: Jan. 13, 1998

[54] BINDER FOR BATTERIES, AND ELECTRODE COMPOSITIONS AND BATTERIES INCORPORATING SAME

[75] Inventors: Tetsuo Shimizu; Yoshihide Higashihata; Takayuki Nakamura, all of Settsu, Japan

[73] Assignee: Daikin Industries, Ltd., Osaka, Japan

[21] Appl. No.: 663,060

[22] PCT Filed: Oct. 18, 1995

[86] PCT No.: PCT/JP95/02150

§ 371 Date: Jun. 18, 1996

§ 102(e) Date: Jun. 18, 1996

[87] PCT Pub. No.: WO96/12764

PCT Pub. Date: May 2, 1996

[30] Foreign Application Priority Data

Oct. 19, 1994 [JP] Japan .................................. 6-281437

[51] Int. Cl.$^6$ .................................................. H01M 4/62
[52] U.S. Cl. .......................................................... 429/217
[58] Field of Search .................................. 429/218, 217, 429/194

[56] References Cited

U.S. PATENT DOCUMENTS 5,324,785 6/1994 Noda et al. ................................ 259/8
5,326,658 7/1994 Takahashi et al. ..................... 429/194

FOREIGN PATENT DOCUMENTS 5-290832 A 11/1993 Japan .
6-145520 A 5/1994 Japan .

*Primary Examiner*—M. Nuzzolillo
*Attorney, Agent, or Firm*—Kubovcik & Kubovcik

[57] ABSTRACT

A binder for use in batteries which is in the form of an aqueous or nonaqueous dispersion or a powder comprising core-shell composite fine particles 0.05 to 1 μm in mean particle size and each having a core of a fibrillating polytetrafluoroethylene and a shell of a nonfibrillating polymer, the composite fine particles having a core-to-shell ratio by weight of 98:2 to 50:50, and electrode compositions and batteries incorporating the binder.

15 Claims, 3 Drawing Sheets

BINDER FOR BATTERIES, AND ELECTRODE COMPOSITIONS AND BATTERIES INCORPORATING SAME

(TECHNICAL FIELD)

The present invention relates to a binder for batteries, and electrode compositions and batteries incorporating the same.

(BACKGROUND ART)

In recent years, there is a growing demand for electric or electronic devices which are compact and suitable to carry, such as audio tape recorders, video tape recorders with a built-in camera, personal computers and cellular phones. With this trend, compactness and high performance are required of batteries, and various new batteries such as nickel-metal hydride batteries and lithium-ion batteries are commercially available in addition to conventional lead batteries and nickel/cadmium batteries. The fabrication of batteries requires binding various electrode materials including, for example, manganese dioxide ($MnO_2$), nickel hydroxide [$Ni(OH)_2$], hydrogen storage alloy, lithium cobalt dioxide ($LiCoO_2$), lithium nickel dioxide ($LiNiO_2$), lithium manganese dioxide ($LiMnO_2$), carbon, graphite, etc. Suitable binders in wide use are fluorine-containing resin materials which have excellent chemical and thermal resistances and have binding properties.

For example, an aqueous dispersion of polytetrafluoroethylene (PTFE) is used in JP-A-236258/1988 for binding $MnO_2$, acetylene black, graphite, etc. serving as positive electrode materials for lithium primary batteries. JP-B-10980/1994 gives an example of binding a manganese oxide, and carbon black or activated carbon with an aqueous dispersion of PTFE for an air-zinc battery. On the other hand, also known is polyvinylidene fluoride (PVDF) used as an example of binder. In regard to nickel-metal hydride batteries, JP-A-44964/1994 describes an electrode prepared by mixing a hydrogen storage alloy, carbonyl nickel powder or like conductive agent with a solution of PVDF to make the mixture into a sheet. JP-A-249860/1992 also discloses the use of PVDF as an example of binder for lithium ion secondary batteries, i.e., the use of an N-methylpyrrolidone solution of PVDF for a positive electrode comprising $LiCoO_2$ or like lithium-containing oxide and graphite and for a negative electrode of carbonaceous material in preparing the respective mixtures and making each mixture into a sheet.

PTFE has the property of being liable to fibrillate by compressive shearing force, and therefore readily produces fibrils when mixed with other powder material and acts to interlock the particles. However, a uniform mixture is difficult to prepare because of excessive fibrillation, and PTFE is likely to impair the characteristics of electrodes if added in an amount more than is necessary. To obtain a uniform mixture, PTFE is usually frequently used in the form of a colloidal aqueous dispersion rather than a powder. The dispersion nevertheless has the problem of fibrillating excessively and encountering difficulty in forming a uniform mixture. Further the use of the aqueous dispersion eventually requires the step of removing a large amount of water and the surfactant contained therein as a stabilizer by heating, and the surfactant and water are likely to adversely affect the characteristics of some types of batteries. For example, the lithium-containing oxides for use in the positive electrode of the lithium ion secondary battery include $LiNiO_2$ which is especially reactive with water and is not usable with the aqueous dispersion of PTFE. In the case where PVDF is used as a binder, the resin is soluble in organic solvents and can therefore be mixed in the form of a solution with electrode materials, consequently forming a uniform mixture and obviating the need for the step of removing water or surfactant unlike the PTFE aqueous dispersion. However, the property of being soluble in organic solvents renders PVDF prone to swell in organic electrolytes, such as propylene carbonate, dimethoxyethane and γ-butyrolactone, for use as battery materials, and swelling is likely to impair the performance of batteries. PVDF has another drawback in being inferior to PTFE in binding properties.

An object of the present invention is to provide a binder for batteries which can be mixed with electrode materials more uniformly than the PTFE aqueous dispersion, is usable also for electrode materials susceptible to an adverse influence of water, does not swell in organic electrolytes unlike PVDF and has excellent binding properties, and electrode compositions and batteries incorporating the binder.

(DISCLOSURE OF THE INVENTION)

The present invention provides a binder for batteries in the form of an aqueous or nonaqueous dispersion or a powder and comprising core-shell composite fine particles 0.05 to 1 μm in mean particle size and each having a core of a fibrillating polytetrafluoroethylene and a shell of a non-fibrillating polymer, the composite fine particles having a core-to-shell ratio by weight of 98:2 to 50:50, and electrode compositions and batteries incorporating the binder.

The fibrillating PTFE forming the cores of composite fine particles of the invention is similar to that of fine particles having a mean particle size of 0.05 to 1 μm and prepared from known tetrafluoroethylene (TFE) by emulsion polymerization. The PTFE is the same material as commercial PTFE fine powder obtained by coagulating and drying an emulsion polymer, or as fine particles constituting a PTFE aqueous dispersion prepared from the emulsion polymer by concentration and stabilization. More specific production processes are made known by JP-B-4643/1962, JP-B-14466/1971, JP-B-26242/1981, etc. The fibrillation is a usual property of a PTFE having such a high molecular weight (at least $10^8$ poises in melt viscosity at 380° C.), which is not melt-processable. Such a PTFE is up to 2.210, preferably 2.200 to 2.130, in terms of standard specific gravity (ASTM D-1457). (The smaller the standard specific gravity, the higher is the molecular weight.) The melt viscosity is determined with use of a Koka flow tester, manufactured by Shimadzu, Ltd., by filling the polymer powder into the cylinder, 11.3 mm in inside diameter, holding the powder at a temperature of 380° C. for 5 minutes, thereafter extruding the melt through an orifice, 0.21 cm in inside diameter (2R) and 0.8 cm in length (L), with a load (7 or 32 kg) applied to the piston, and measuring the rate of outflow (Q: $cm^2/sec$), followed by calculation from the equation given below.

$$\text{Melt viscosity (poises)} = \frac{\Delta P \cdot 2R \cdot \pi \cdot R^3}{16 \cdot L \cdot Q}$$

ΔP: load (dynes)

If the standard specific gravity is greater than 2.210, that is, if the molecular weight is lower, the polymer is less likely to fibrillate. When the PTFE has a high molecular weight whose standard specific gravity is smaller than 2.130, this type of polymer is difficult to produce and is not suitable actually although still retaining the fibrillating property inherent therein. In the emulsion polymerization of TFE, a small amount (0.001 to 2 wt. %) of other fluorine-containing monomer (such as chlorotrifluoroethylene, hexafluoropropene, fluoroalkylethylene or fluoroalkyl fluorovinyl ether) may be copolymerized therewith as the case may be. Fine particles of such a so-called modified PTFE retain the fibrillating property intact and are included in the invention.

Although the standard specific gravity or molecular weight serves as an index of the fibrillating property, whether or not the fine particles prepared by emulsion polymerization are extrudable in the form of a paste, provides an actual standard in the case of the present invention. It is desired that a continuous extrudate be available and that the elongation thereof be at least about 10% at room temperature.

The nonfibrillating polymer for forming the shells of the composite fine particles is a low-molecular-weight polytetrafluoroethylene, polyvinylidene fluoride, fluorine-containing copolymer comprising at least one of tetrafluoroethylene, vinylidene fluoride (VDF) and chlorotrifluoroethylene (CTFE) as a component monomer, or at least one polymer selected from among those prepared by polymerizing a hydrocarbon monomer which is liquid at room temperature. The low-molecular-weight PTFE is preferably less than $10^8$ poises, more preferably $10^2$ to $10^7$ poises, in melt viscosity at 380° C.

Examples of fluorine-containing copolymers comprising at least one of TFE, VDF and CTFE as a component monomer are a copolymer (generally known as FEP) of TFE and hexafluoropropylene (HFP), copolymer (generally known as PFA) of TFE and perfluoro(alkyl vinyl ether) (PFAVE), terpolymer of TFE, HFP and PFAVE, copolymer of TFE and a perfluoro(alkyl)ethylene, copolymer (generally known as ETFE) consisting essentially of ethylene and TFE, copolymer (generally known as ECTFE) consisting essentially of ethylene and CTFE, copolymer of TFE and CTFE, co- or ter-polymer of VDF and TFE, and/or HFP, terpolymer of VDF, TFE and CTFE, etc. Such copolymers will exhibit the properties of resins having a glass transition temperature higher than room temperature or the properties of rubbers whose glass transition temperature is lower than room temperature, depending on their composition, whereas useful copolymers are not limited specifically as to such properties, nor are they limited specifically in molecular weight. In the case of the copolymers of TFE, however, it is desired that more than 2 wt. % of the other monomer(s) be present.

Examples of hydrocarbon monomers which are liquid at room temperature are methyl acrylate, methyl methacrylate, ethyl acrylate, ethyl methacrylate, n-propyl acrylate, n-propyl methacrylate, isopropyl acrylate, isopropyl methacrylate, lauryl acrylate, stearyl acrylate and like α,β-ethylenically unsaturated carboxylic acid esters, 2-hydroxyethyl acrylate, 2-hydroxyethyl methacrylate, 3-hydroxypropyl methacrylate and like hydroxyalkyl esters of α,β-ethylenically unsaturated carboxylic acids, diethylene glycol methacrylate and like alkoxyalkyl esters of α,β-ethylenically unsaturated carboxylic acids, acrylamide, methylol methacrylamide and like α,β-ethylenically unsaturated carboxylic acid amides, acrylic acid, methacrylic acid, itaconic acid, maleic anhydride, maleic acid, fumaric acid, crotonic acid and like α,β-ethylenically unsaturated carboxylic acids, styrene, alkylstyrenes, acrylonitrile, vinylpyrrolidone, alkyl vinyl ethers, pyrrole, etc. Homopolymers or copolymers of such monomers are usable as the polymer for the shells. The α,β-ethylenically unsaturated carboxylic acids, hydroxyalkyl-containing α,β-ethylenically unsaturated carboxylic acid esters and amides are excessively hydrophilic and encounter difficulty in forming shells when in the form of homopolymers, so that it is desired to copolymerize these monomers with other hydrophobic monomer.

Among the nonfibrillating polymers given above for forming the shells, preferable are the polymers containing TFE since a shell forming reaction can be conducted easily, continuously following the preparation of the fibrillating PTFE for the cores.

The core-shell composite fine particles of the present invention can be prepared according to the process disclosed in JP-A-154842/1992 when a low-molecular-weight PTFE is used for the shells, the process of WO94/1475 when a VDF-type resin is used, the process of JP-B-63584/1988 when a copolymer of TFE and CTFE is used for the shells, the process of JP-A-158651/1990 when ETFE or ECTFE is used for the shells, or the process of JP-A-312836/1988 when a polymer of α,β-unsaturated carboxylic acid ester is used for the shells. While the particles are 0.05 to 1 μm in mean size, particles greater than 1 μm can be obtained as by so-called seed polymerization. However, dispersions containing fine particles of large size are unstable to preserve, hence a problem. Too small particles are less likely to undergo sufficient fibrillation when mixed with electrode materials.

The composite fine particles of the invention have a core-to-shell ratio by weight of 98:2 to 50:50. If the proportion of shells is too small, the particles will not be mixed with electrode materials uniformly or are not dispersable smoothly in organic media. An excessive proportion of shells impairs the inherent binding properties of the particles, or is more likely to entail the problem of swelling within batteries in the case where the shells are formed of a VDF-type polymer or a polymer comprising a hydrocarbon monomer which is liquid at room temperature. Preferably, the ratio is 95:5 to 60:40.

The binder of the invention for use in batteries is in the form of any of an aqueous dispersion, nonaqueous dispersion or powder. Being in the form of composite fine particles proves most effective when the binder is a nonaqueous dispersion or powder although the form of the binder is selected according to the type of battery and the kind of electrode materials. The PTFE conventionally used as a binder is a fine powder or aqueous dispersion, but no nonaqueous dispersion thereof is available. The nonaqueous dispersion is easily mixed with electrode materials, does not contain a large amount of surfactant unlike the aqueous dispersion, and accordingly does not require eventual removal thereof. Further in the case of nonaqueous electrolyte secondary batteries wherein a lithium-containing oxide is used for the positive electrode, the absence of water is preferred, and the nonaqueous dispersion is therefore desirable. On the other hand, the powder of the invention, which can be mixed as it is with electrode materials effectively unlike the fine powder, is redispersable in aqueous media containing a surfactant or in organic media. This affords greater freedom in selecting a particular method of mixing with electrode materials. Thus, a wide variety of mixing methods are usable for the battery binder of the invention according to the kind of electrode materials.

It is suitable that the concentration of polymer fine particles in the aqueous dispersion or nonaqueous dispersion be 5 to 65 wt. %. Lower concentrations lead to a poor efficiency when the dispersion is mixed with electrode materials, while excessively high concentrations render the dispersion highly viscous and result in the drawback that the dispersion is difficult to handle. If the aqueous dispersion is transported or handled as it is, a problem is liable to arise in the stability of the dispersion, therefore it is desirable to adjust the pH to an alkalinity value of 7 to 11 and add a surfactant to the dispersion for stabilization. The type of surfactant is not limited specifically. At least one of anionic, cationic and nonionic types is usable. Nonionic surfactants are generally desirable. Examples are a group of surfactants of the fatty acid ester of polyoxy-compound such as glycol esters of fatty acids, and sorbitol and mannitol esters of fatty acids, and a group of surfactants of the polethylene oxide condensate type such as polyethylene oxide condensates of higher fatty acids, higher alcohols, higher alkylamines, higher fatty acid amides, higher alkylmercaptans and alkylphenols. The surfactant is used in an amount of 1 to 20% based on the total weight of the fine particles in the aqueous dispersion. Too small an amount leads to insufficient dispersion stability, whereas excessive amounts adversely affect the performance of batteries. The surfactant is not essential to the battery and can therefore be dispensed with.

The powder of the present invention is prepared from an aqueous dispersion obtained by emulsion polymerization, by separating polymer fine particles from the dispersion by a usual method of coagulation (see, for example, the specification of U.S. Pat. No. 2,593,583), followed by drying. The drying must be effected at a low temperature so as not to permit the fusion of the shells of the fine particles. The mean particle size of the powder is suitably 1 to 30 µm although not limited specifically. A powder smaller than 1 µm in particle size is not available substantially. Particles greater than 30 µm in size can not be mixed with electrode materials effectively. The particle size is controllable by varying the concentration or temperature of the aqueous dispersion and the intensity of stirring during the coagulation. The powder is in the form of agglomerates of 0.05- to 1-µm fine particles, and the mean particle size is the secondary size thereof. On the other hand, the nonaqueous dispersion of the invention can be readily prepared by redispersing the powder in a dispersant solvent mechanically or ultrasonically. Alternatively, the aqueous dispersion can be made into a nonaqueous dispersion by the phase transfer process described in JP-B-17016/1974 without resorting to the powder forming process. However, the polymer fine particles in the nonaqueous dispersion are less likely to be finely dispersed therein unlike those in the aqueous dispersion, and become agglomerated to some extent. The agglomerates of particles are usually 1 to 3 µm in size. Nevertheless, the fine particles are not coherent but are merely agglomerate. The term "mean particle size" as defined in claim 1 of the invention does not mean the size of the agglomerates but refers to the size of the core-shell composite fine particles substantially having a binding effect.

The dispersant for the nonaqueous dispersion is not limited particularly insofar as it is an organic liquid capable of wetting the fine particles of TFE-type polymer. Examples of dispersants preferred for use are aromatic hydrocarbons such as benzene, toluene and xylene, hydrocarbon halides such as carbon tetrachloride and trichloroethylene, ketones and esters such as methyl isobutyl ketone, diisobutyl ketone and butyl acetate, alcohols such as water-soluble methanol, ethanol and isopropyl alcohol, N-methylpyrrolidone, etc. The organic liquid, such as carbon tetrachloride, trichloroethylene or diisobutyl ketone, which is less likely to wet the particles when used singly, can be made into an organosol by adding a small amount of an oil-soluble surfactant. In view of the dispersability of the fine particles, handling-ability thereof in preparing the electrodes, or toxicity, especially desirable organic liquids for use are isopropyl alcohol, methyl isobutyl ketone and N-methylpyrrolidone. The use of the organosol for preparing electrode materials entails the advantage that the resulting dispersion is easier to dry than the aqueous dispersion and less likely to permit the surfactant to adversely affect the electrode than the aqueous dispersion.

The electrode composition of the present invention comprises a powdery electrode material and 0.1 to 10 wt. % of core-shell composite fine particles 0.05 to 1 µm in mean particle size and each having a core of the fibrillating polytetrafluoroethylene and a shell of a nonfibrillating polymer. Examples of powdery electrode materials are active materials for batteries, conductive agents, catalysts, etc. although they vary with the type of batteries. The active materials for batteries are divided generally into positive electrode active materials and negative electrode active materials. Examples of positive electrode active materials are powders of lithium cobalt dioxide, lithium nickel dioxide, lithium manganese oxide compounds, lithium vanadium oxide compounds, lithium iron oxide, lithium compounds, i.e., complex oxides of these compounds and transition metal oxides, manganese dioxide, zinc oxide, nickel oxide, nickel hydroxide, copper oxide, molybdenum oxide, carbon fluoride, etc. Such examples also include N-fluoropyridinium compounds, N-fluorosulfonamide compounds, N-fluoroquinuclidinium compounds, N-fluoro-1,4-diazoniabicyclo[2.2.2]octane compounds, N-fluorodisulfonimide compounds, N-fluoroamide compounds, N-fluorocarbamate compounds, N-fluoropyridone compounds (see JP-A-6756/1995) and further mixtures of salts of these compounds and lithium salts, especially a mixture of N-fluoropyridinium salt and lithium salt in a lithium salt-to-N-fluoropyridinium salt molar ratio in the range of 0.1 to 5. On the other hand, examples of negative electrode active materials are metallic lithium and like alkali metals, alloys thereof, alkali metal absorbing carbon materials, zinc, cadmium hydroxide, hydrogen storage alloys, etc. Examples of conductive agents are powders of active carbon, carbon black, acetylene black, graphite, conductive polymers typical of which is polyaniline, etc. The catalyst is, for example, finely divided platinum for use in fuel cells and the like. The electrode composition of the invention may have incorporated therein hydrophilic binders such as polyvinyl alcohol, polyacrylic acid, polyacrylic acid salts, methyl cellulose, carboxymethyl cellulose, hydroxypropyl cellulose and polyacrylamide, organic electrolytes comprising one or a mixture of propylene carbonate, ethylene carbonate, dimethoxyethane and γ-butyrolactone which have dissolved therein lithium perchlorate, lithium boron fluoride, cesium carbonate or the like, and inorganic electrolytes such as aqueous solution of potassium hydroxide, in addition to the above electrode materials. The binder of the invention is suitable for use in batteries wherein a nonaqueous electrolyte is used, especially for use in nonaqueous electrolyte secondary batteries wherein a lithium compound is used for the positive electrode.

(BEST MODE OF CARRYING OUT THE INVENTION)

Figure 1:
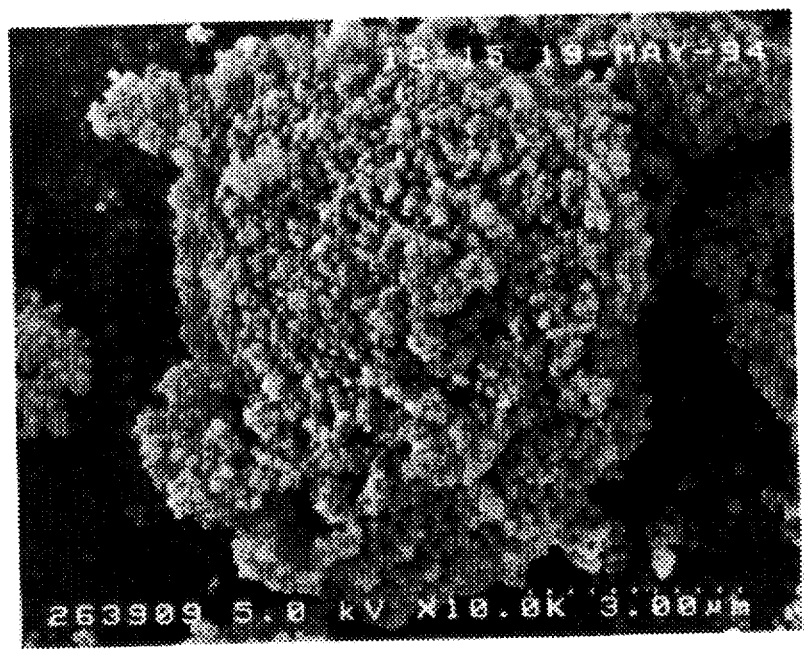
FIG. 1 is a photo of scanning electron microscope showing the structure of a binder powder obtained in Reference Example 1.

The present invention will be described below in greater detail with reference to reference examples, examples and comparative examples.

In the present invention, paste extrusion tests were conducted in the following manner.

An aqueous dispersion is heated at 100° C. to evaporate off the water, and the emulsifier used for polymerization and the surfactant, added for stabilization after concentration as the case may be, are then fully extracted with acetone. With 50 g of a cakelike polymer obtained is thereafter mixed in a glass bottle 10.8 g of an extrusion aid (brand name "IP1620," product of Idemitsu Petrochemical Co., Ltd.) which is a hydrocarbon oil, followed by standing at room temperature (25°±2° C.) for 8 hours to make the polymer fully compatible with the extrusion aid. Subsequently, the mixture is filled into an extrusion die equipped with a cylinder (25.4 mm in inside diameter) and having at its lower end an orifice, 30 deg in reduction angle, 2.54 mm in inside diameter and 7 mm in land length, and is held for 1 minute with a load of 60 kg applied to a piston inserted in the cylinder. Immediately thereafter, the mixture is extruded indoors at a ram velocity (velocity of depression of the piston) of 20 mm/min. When a continuous extrudate is available, the assisting agent is dried at 80° C., and the extrudate is subjected to a tensile test at room temperature along the direction of extrusion at a rate of pulling of 20 mm/min.

REFERENCE EXAMPLE 1

An aqueous dispersion of core-shell composite fine particles with cores of PTFE and shells of ETFE (core-to-shell weight ratio 91:9) was prepared according to JP-A-158651/1990, Example 1.

First, into a 3-liter autoclave of stainless steel (SUS 316) equipped with anchor agitator blades of stainless steel and a temperature-adjusting jacket were placed 1450 ml of deionized water, 90 g of liquid paraffin and 1.5 g of ammonium perfluorooctanate. The air within the system was replaced by nitrogen gas three times and by tetrafluoroethylene (TFE) twice to remove oxygen, the internal pressure was thereafter adjusted to 1.0 MPa with TFE, and the mixture was maintained at 70° C. with stirring at 280 r.p.m.

Next, 0.2 g of hexafluoropropene (HFP) and 50 ml of an aqueous solution having 80 mg of ammonium persulfate (APS) dissolved therein as a polymerization initiator were placed into the system to start a reaction. During the reaction, TFE was continuously supplied so as to maintain the internal pressure at 1.0 Mpa at all times while maintaining the internal temperature at 70° C. with stirring at 280 r.p.m.

The stirring and supply of TFE were discontinued when the amount of TFE consumed by the reaction after the addition of the initiator reached 390 g, and the gas was released until the internal pressure of the autoclave dropped to 0.3 MPa. A gas mixture of ethylene and TFE containing 48 mol % of ethylene was further supplied to the autoclave through another line to a pressure of 1.0 MPa, and a continued reaction was effected with stirring resumed and the pressure maintained. Upon consumption of 37 g of the gas mixture, the stirring was discontinued, and the gas was vented to terminate the reaction.

An aqueous dispersion was obtained which was found to contain a solid component at a concentration of 22.0 wt. % (approximately equal to the concentration of the resulting polymer), as determined by evaporating a portion of the dispersion to dryness. The polymer fine particles had a mean particle size of 0.20 μm as measured using a photo of electron microscope.

To a portion of the aqueous dispersion was added a commercial nonionic surfactant, i.e., Triton X-100 (product of Rohm & Haas Co.), in an amount of 5.0 wt. % based on the weight of the polymer present. The mixture was then adjusted to a pH of 9.0 with aqueous ammonia, followed by evaporation of water in a vacuum to obtain a concentrate having a polymer solid content of 60 wt. %. The polymer fine particles in the concentrated aqueous dispersion had the same mean particle size of 0.20 μm as the original aqueous dispersion, as measured with use of a photo of electron microscope.

Two liters of the aqueous dispersion resulting from the reaction was placed into a 5-liter container of stainless steel equipped with a turbine impeller mixer, and stirred at room temperature with addition of 10 g of ammonium carbonate to effect coagulation. The wet particles obtained were dried in an electric oven at 120° C. for 16 hours to obtain a powder. When checked for mean particle size by the dry laser beam scattering method (particle size distribution measuring device of the laser diffraction type, HELOS & RODOS, produced by Shinpatech Co., Ltd.), the powder was 5 μm in mean particle size. FIG. 1 is a photo of scanning electron microscope showing the structure of the powder. The photograph reveals that the powder comprises agglomerates of 0.20-μm fine particles. When tested for paste extrusion, the aqueous dispersion gave no continuous extrudate.

Subsequently, 10 g of the dry powder and 90 g of isopropyl alcohol were placed into a 200-ml container and irradiated with ultrasonic waves at a frequency of 20 kHz and output of 100 W to prepare a nonaqueous dispersion. The fine particles dispersed in the isopropyl alcohol were checked for mean particle size by an automatic particle size distribution measuring device (CAPA-700), product of Horiba Seisakusho Co., Ltd., in a spontaneous settling mode to find that the size was 1.25 μm. Although this value is greater than the mean particle size of the original fine particles since the composite fine particles in the isopropyl alcohol agglomerate to some extent, the photo of scanning electron microscope of the polymer revealed that the fine particles forming the agglomerates as basic units had the same mean particle size as the fine particles in the original aqueous dispersion as prepared by polymerization.

REFERENCE EXAMPLE 2

A polymer was prepared by the reaction of Reference Example 1 according to JP-A-158651/1990 without effecting the shell forming reaction. The fine particles of the polymer were found to be 0.19 μm in mean particle size by measurement with a photo of electron microscope. A portion of the aqueous dispersion obtained was treated in the same manner as in Reference Example 1 for coagulation and drying to obtain an agglomerate powder, which was 400 μm in mean particle size and 2.180 in standard specific gravity, hence a high molecular weight like the commercial PTFE fine powder. The paste extrusion test of the polymer from the aqueous dispersion afforded a continuous extrudate, which was found to be 300% in elongation by a tensile test.

When the powder was dispersed in isopropyl alcohol as in Reference Example 1, the dispersed particles were not smaller than the original particle size. The remaining portion of the aqueous dispersion was concentrated by the same procedure as in Reference Example 1.

REFERENCE EXAMPLE 3

An aqueous dispersion of PTFE was prepared by the same procedure as in Reference Example 1 with the exception of using a 6-liter autoclave of stainless steel, 2950 ml of deionized water, 120 g of liquid paraffin, 3.0 g of ammonium perfluorooctanate, 0.4 g of hexafluoropropene and 12 mg of APS as a polymerization initiator, and discontinuing stirring and supply of TFE and releasing the gas when the amount of TFE consumed by the reaction after the addition of the initiator reached 330 g. The dispersion contained a solid component at a concentration of 24 wt. %, and the polymer fine particles were 0.22 µm in mean particle size.

Next, 401.6 g of the aqueous dispersion and 153.4 g of deionized water were placed into a 1-liter separable flask and mixed together with addition of 5 g of an aqueous solution containing 0.5 g of ammonium perfluorooctanate dissolved therein, followed by stirring at 150 r.p.m.

The interior of the flask was then heated to 70° C. in a nitrogen stream, and a solution of 100 mg of the polymerization initiator, APS, in 19.9 g of water was further placed in. The mixture was reacted while adding 3.4 g of methyl methacrylate monomer (MMA) in six divided portions at an interval of 10 minutes. The stirring was discontinued after 90 minutes, and the mixture was withdrawn from the system.

An aqueous dispersion was obtained which contained a solid component at a concentration of 20 wt. % as determined by evaporating a portion of the dispersion to dryness. The polymer fine particles were 0.25 µm in mean particle size. The amount of PMMA of the shells was 16.2 wt. % as determined by thermal decomposition. A 250 g quantity of the aqueous dispersion was dried in a vacuum dryer at 50° C. for 24 hours, giving about 58 g of a white solid. A powder with a mean particle size of about 6 µm was obtained by pulverizing the solid.

EXAMPLE 1

Figure 2:
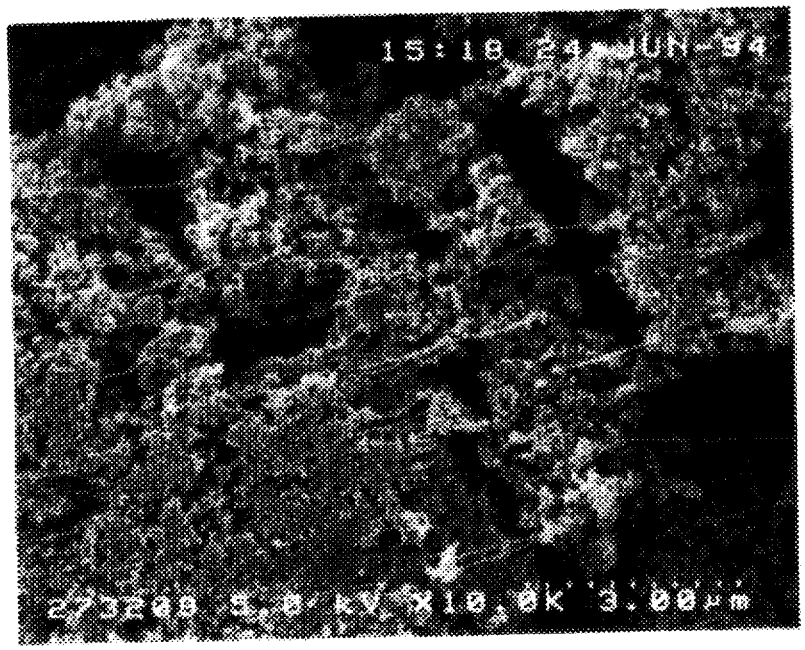
FIG. 2 is a photo of scanning electron microscope at a magnification of ×10,000 showing the configuration of fibers in an electrode obtained in Example 1.

A 2.5 g quantity of the nonaqueous dispersion prepared in Reference Example 1, 20 g of manganese dioxide and 2.5 g of conductive carbon were placed into an automatic mortar and mixed together for 15 minutes. The mixture made into a paste was thereafter applied to an 80-mesh metal net plated with nickel and dried at 100° C. Subsequently, an electrode was prepared by rolling the coated net with rolls. The paste was made from the mixture and the electrode material remained fixed to the metal net because the composite fine particles underwent fibrillation. FIG. 2 is a photo of scanning electron microscope showing the configuration of fibers in the electrode at a magnification of ×10,000. The photograph reveals fibrils produced.

EXAMPLE 2

A 2.8 g quantity of the concentrate of the aqueous dispersion obtained in Reference Example 1, 20 g of manganese dioxide and 2.5 g of conductive carbon were placed into an automatic mortar along with 20 ml of water, followed by mixing for 30 minutes. The mixture made into a paste was thereafter applied to an 80-mesh metal net plated with nickel and dried at 100° C. Subsequently, an electrode was prepared by rolling the coated net with rolls. A photo of scanning electron microscope of the electrode was similar to that of FIG. 2.

COMPARATIVE EXAMPLE 1

While the powder of Reference Example 2 failed to finely disperse in isopropyl alcohol, 20 g of manganese dioxide and 2.5 g of conductive carbon were added to a mixture of 2.5 g of the powder and 22.5 g of isopropyl alcohol, followed by mixing in an automatic mortar as in Example 1. However, the mixture failed to become a paste in its entirety with fine particles forming a mass.

COMPARATIVE EXAMPLE 2

The procedure of Example 2 was repeated using 2.8 g of the concentrate of the aqueous dispersion obtained in Reference Example 2, affording a paste and an electrode. A photo of scanning electron microscope revealed that the state of fine particles as dispersed was inferior to that of Example 2.

EXAMPLES 3 AND 4, AND COMPARATIVE EXAMPLE 3

One hundred parts by weight of lithium nickel dioxide having a mean particle size of 5 µm (product of Honjo Chemical Co., Ltd.), 3 parts by weight of acetylene black (product of Denki Kagaku Kogyo K.K.) as a conductive agent and 5 parts by weight of the powder of Reference Example 1 as a binder were mixed together, and NMP was further added so that the resulting mixture would be 50% in solids concentration, followed by treatment in a mixer for 20 minutes to prepare a paste.

The paste was applied to 25-µm-thick aluminum foil and dried at 100° C. The coating as dried had a thickness of 120 µm. A positive electrode sheet 1 was prepared by rolling the resulting sheet with rolls until the thickness of the coating reduced to 100 µm. The positive electrode sheets 3, 2 were similarly prepared using the powders of Reference Examples 3, 2, respectively. A uniform coating was not available for the positive electrode sheet 2 with white spots produced on its surface. Subsequently, 100 squares, 1 mm×1 mm, were formed on each sheet by cutting the coating crosswise with a cutter knife, and the number of squares remaining without being peeled off was counted. Table 1 shows the result.

Figure 3:
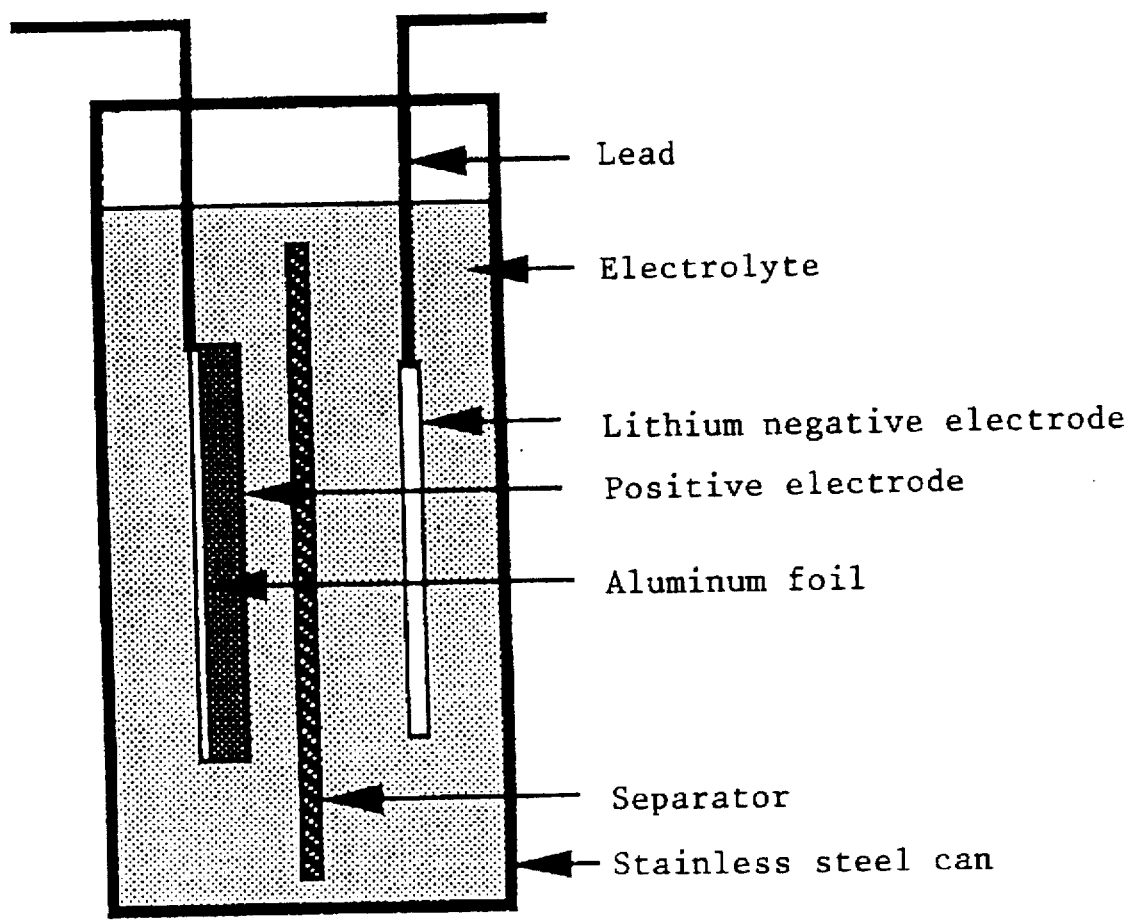
FIG. 3 is a diagram showing a battery of simplified construction for evaluating charge-discharge characteristics with use of the positive electrodes prepared in Examples 3 and 4 and Comparative Example 3.

The positive electrode sheets were further tested for the evaluation of battery characteristics in the following manner. A rectangular piece, 3×5 cm, was cut out from the sheet, and a lead attached to the piece to prepare a positive electrode. Metallic lithium foil was used as a negative electrode. A secondary battery as shown in FIG. 3 was fabricated by positioning the electrodes as opposed to each other with a polypropylene separator interposed therebetween and using a solution of 1 mol/liter of lithium perchlorate in propylene carbonate as an electrolyte. The battery was repeatedly charged and discharged under the conditions of charge-discharge current density 1 mA/cm$^2$, charge termination voltage 4.3 V and discharge termination voltage 3.0 V to determine the time when the capacity decreased below 60% of the initial capacity as cycle life. Table 1 shows the average result obtained by subjecting 10 batteries to the cycle test for each positive electrode sheet. The table reveals that the positive electrode sheets 1, 3 are exceedingly superior to the positive electrode sheet 2 in adhesion and cycle life.

TABLE 1

|  | Positive electrode sheet 1 | Positive electrode sheet 3 | Positive electrode sheet 2 |
| --- | --- | --- | --- |
| Number of remaining squares | 90 | 91 | 20 |
| Cycle life (number of cycles) | 250 | 290 | 32 |

(INDUSTRIAL APPLICABILITY)

The invention provides a binder for use in batteries which can be mixed with electrode materials more uniformly than the conventional PTFE aqueous dispersion, is usable for electrode materials susceptible to an adverse influence of water, does not swell in organic electrolytes unlike PVDF and has excellent binding properties, and electrode compositions and batteries having the binder incorporated therein.

We claim:

1. A composition for an electrode comprising 0.1 to 10 wt. % of core-shell composite fine particles and, as the balance, a powdery electrode material, the composite fine particles being 0.5 to 1 μm in mean particle size, each comprising a core of a fibrillating polytetrafluoroethylene and a shell of a nonfibrillating polymer, and having a core-to-shell ratio by weight of 98:2 to 50:50.

2. A nonaqueous electrolyte secondary battery comprising a positive electrode, said positive electrode comprising a lithium compound as an active material, an electrically conductive agent and a binder; a negative electrode and a nonaqueous electrolyte, wherein the binder comprises core-shell composite fine particles 0.05 to 1 μm in mean particle size and each having a core of a fibrillating polytetrafluoroethylene and a shell of a nonfibrillating polymer, the composite fine particles having a core-to-shell ratio by weight of 98:2 to 50:50.

3. The electrode composition of claim 1, wherein said nonfibrillating polymer is selected from the group consisting of a low molecular weight polytetrafluoroethylene, polyvinylidene fluoride, a copolymer of tetrafluoroethylene, a copolymer of vinylidene fluoride, a copolymer of chlorotrifluoroethylene and a polymer of a hydrocarbon monomer that is liquid at room temperature.

4. The electrode composition of claim 1, wherein said nonfibrillating polymer is a polymer comprising tetrafluoroethylene.

5. The electrode composition of claim 1, wherein said nonfibrillating polymer is a copolymer of tetrafluoroethylene and a monomer selected from the group consisting of hexafluoropropylene, a perfluoro(alkylvinyl ether), a perfluoro(alkyl)ethylene, ethylene, vinylidene fluoride and chlorotrifluoroethylene; a copolymer of chlorotrifluoroethylene and ethylene; a copolymer of vinylidene fluoride and hexafluoropropylene; a terpolymer of tetrafluoroethylene, hexafluoropropylene and perfluoro(alkyl vinyl ether); a terpolymer of tetrafluoroethylene, vinylidene fluoride and hexafluoropropylene and a terpolymer of tetrafluoroethylene, vinylidene fluoride and chlorotrifluoroethylene.

6. The electrode composition of claim 1, wherein the composite fine particles have a core-to-shell ratio by weight of 95:5 to 60:40.

7. The electrode composition of claim 1, wherein said powdery electrode material comprises a positive electrode active material.

8. The electrode composition of claim 1, wherein said positive electrode active material is a lithium compound.

9. The electrode composition of claim 1, wherein said powdery electrode material comprises a negative electrode active material.

10. The nonaqueous electrolyte secondary battery of claim 2, wherein said nonfibrillating polymer is selected from the group consisting of a low molecular weight polytetrafluoroethylene, polyvinylidene fluoride, a copolymer of tetrafluoroethylene, a copolymer of vinylidene fluoride, a copolymer of chlorotrifluoroethylene and a polymer of a hydrocarbon monomer that is liquid at room temperature.

11. The nonaqueous electrolyte secondary battery of claim 2, wherein said nonfibrillating polymer is a polymer comprising tetrafluoroethylene.

12. The nonaqueous electrolyte secondary battery of claim 2, wherein said nonfibrillating polymer is a copolymer of tetrafluoroethylene and a monomer selected from the group consisting of hexafluoropropylene, a perfluoro(alkylvinyl ether), a perfluoro(alkyl)ethylene, ethylene, vinylidene fluoride and chlorotrifluoroethylene; a copolymer of chlorotrifluoroethylene and ethylene; a copolymer of vinylidene fluoride and hexafluoropropylene; a terpolymer of tetrafluoroethylene, hexafluoropropylene and perfluoro(alkyl vinyl ether); a terpolymer of tetrafluoroethylene, vinylidene fluoride and hexafluoropropylene and a terpolymer of tetrafluoroethylene, vinylidene fluoride and chlorotrifluoroethylene.

13. The nonaqueous electrolyte secondary battery of claim 2, wherein the composite fine particles have a core-to-shell ratio by weight of 95:5 to 60:40.

14. The electrode composition of claim 1, wherein said composition is prepared from a mixture of said electrode material and a nonaqueous dispersion or a powder comprising said core-shell composite fine particles, said powder having a size of 1 to 30 μm.

15. The nonaqueous electrolyte secondary battery of claim 2, wherein said positive electrode is prepared from a mixture of a lithium compound, an electrically conductive agent and a nonaqueous dispersion or a powder comprising said core-shell composite fine particles, said powder having a particle size of 1 to 30 μm.

* * * * *